US010283976B2

(12) United States Patent
Luo

(10) Patent No.: US 10,283,976 B2
(45) Date of Patent: May 7, 2019

(54) MULTIFUNCTIONAL DATA MOBILE POWER SUPPLY AND CHARGING METHOD

(71) Applicant: Beijing Yuanlong Yato Culture Dissemination Co., Ltd., Beijing (CN)

(72) Inventor: Bailin Luo, Beijing (CN)

(73) Assignee: Beijing Yuanlong Yato Culture Dissemination Co., Ltd., Beijing (CN)

( * ) Notice: Subject to any disclaimer, the term of this patent is extended or adjusted under 35 U.S.C. 154(b) by 85 days.

(21) Appl. No.: 15/522,326

(22) PCT Filed: Mar. 24, 2015

(86) PCT No.: PCT/CN2015/074973
§ 371 (c)(1),
(2) Date: Jul. 13, 2017

(87) PCT Pub. No.: WO2016/065822
PCT Pub. Date: May 6, 2016

(65) Prior Publication Data
US 2017/0324258 A1 Nov. 9, 2017

(30) Foreign Application Priority Data

Oct. 27, 2014 (CN) .......................... 2014 1 0584504
Oct. 27, 2014 (CN) ...................... 2014 2 0628371 U

(51) Int. Cl.
*H02J 7/00* (2006.01)
*G05B 15/02* (2006.01)

(52) U.S. Cl.
CPC ............ *H02J 7/0026* (2013.01); *G05B 15/02* (2013.01); *H02J 7/0021* (2013.01); *H02J 7/0047* (2013.01);
(Continued)

(58) Field of Classification Search
CPC .... G06K 19/077; G06K 19/08; G06K 7/0004; G06K 7/0008; G06K 7/10237; H04B 5/0031; H04L 69/08
(Continued)

(56) References Cited

U.S. PATENT DOCUMENTS

2011/0316472 A1* 12/2011 Han .................... G06F 13/4068
320/103
2017/0329734 A1* 11/2017 Luo ......................... G06F 13/38

FOREIGN PATENT DOCUMENTS

CN 201797205 U 4/2011
CN 202586430 U 12/2012
(Continued)

*Primary Examiner* — Shaima Q Aminzay
(74) *Attorney, Agent, or Firm* — Ling Wu; Stephen Yang; Ling and Yang Intellectual Property

(57) ABSTRACT

A multifunctional data mobile power supply (01) and a charging method thereof are provided. The power supply includes a gear selection switch (02), a main control chip (03), a mobile power supply module (04) and an interface module (05). The gear selection switch is configured to select different operation modes for executing by an opening and/or closing operation. The main control chip is configured to detect a gear selection signal of the gear selection switch, and after the charging mode is selected, send an operation command to the mobile power supply module. The mobile power supply module is configured to charge an intelligent mobile terminal which the interface module is connected with after receiving the operation command. The interface module is configured to connect with the external device.

17 Claims, 2 Drawing Sheets

(52) U.S. Cl.
CPC .......... *H02J 7/0052* (2013.01); *H02J 7/0054* (2013.01); *H02J 2007/006* (2013.01); *H02J 2007/0062* (2013.01)

(58) Field of Classification Search
USPC ........................................................ 455/41.1
See application file for complete search history.

(56) References Cited

FOREIGN PATENT DOCUMENTS

| | | | | |
|---|---|---|---|---|
| CN | 203278279 U | 11/2013 | | |
| CN | 203312846 | * 11/2013 | ............. | G06F 13/40 |
| CN | 203312846 U | 11/2013 | | |
| CN | 203368103 U | 12/2013 | | |
| CN | 103944224 A | 7/2014 | | |
| CN | 104283284 A | 1/2015 | | |
| CN | 204304476 U | 4/2015 | | |

\* cited by examiner

S101, An interface module 05 is connected with an external device, and a gear selection switch 02 selects different operation modes by an opening and/or closing operation S102, A main control chip 03 detects a gear selection signal of the gear selection switch 02, and sends an operation command to a mobile power supply module 04 after the gear selection switch 02 selects a charging mode S103, The mobile power supply module 04 executes the charging mode after receiving the operation command sent by the main control chip 03

FIG. 2

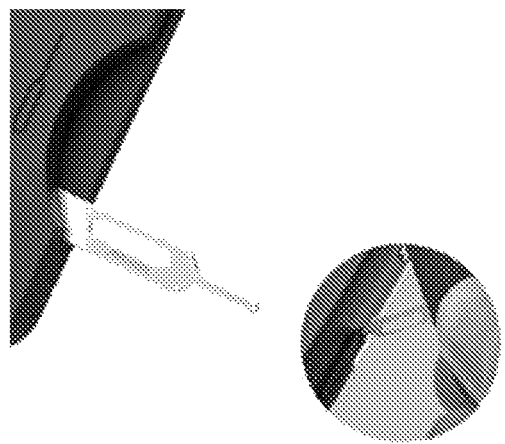

FIG. 3

MULTIFUNCTIONAL DATA MOBILE POWER SUPPLY AND CHARGING METHOD

TECHNICAL FIELD

The present invention relates to the field of multifunctional data mobile power supply and a charging technology, and more particularly to a multifunctional data mobile power supply and a charging method thereof.

BACKGROUND

With the advent of the mobile internet era, intelligent mobile terminal devices have become gradually essential communication & entertainment tools for people in life, and at work, and on a journey. However, with the growth of entertainment, power consumption of the mobile terminal has increased greatly, such that charging at anytime, anywhere for the mobile terminal device is required. Additionally, with the rapid development of the OTG (On-The-Go) technology, a data processing device between the intelligent mobile terminals in the OTG mode emerges as the times require, However, intelligent mobile terminals which can be connected with the current device are relatively simple, and cannot simultaneously support data transmission between the intelligent mobile terminal and a personal computer (PC). Furthermore, related portable devices only support the universal serial bus (USB) or only support the connection with an interface of a card reader, thus people usually have to carry a variety of charging, data transmission, and storage accessories in the bag to meet different requirements, which bring burden and inconvenience for people. Therefore, it is urgent to develop a multifunctional portable device which can charge for the user at anytime, support a variety of data transmission modes, and connect with multiple intelligent mobile terminals, and support the USB and the interface of the card reader at the same time, thereby reducing the burden of the user's bag and enhancing the user experience.

SUMMARY

In order to solve the above-mentioned problems, the present invention proposes a multifunctional data mobile power supply and a charging method thereof, which can charge for the user at anytime and anywhere, and connect to multiple intelligent mobile terminals and support multiple operation modes, and support connections to the universal serial bus (USB) and the reader interface at the same time. The multifunctional data mobile power supply has a variety of functions, and is compact and portable, thereby reducing the burden of the user's bag and enhancing the user experience.

In order to achieve the above-mentioned objectives, the following technical scheme is adopted.

A multifunctional data mobile power supply includes a gear selection switch, a main control chip, a mobile power supply module and an interface module.

The gear selection switch is configured to select different operation modes by an opening and/or closing operation.

The main control chip is configured to detect the operation mode selected by the gear selection switch, and after the gear selection switch selects a charging mode, send an operation command corresponding to the charging mode to a mobile power supply module.

The mobile power supply module is configured to execute the charging mode after receiving the operation command corresponding to the charging mode and sent by the main control chip.

The interface module is configured to connect with an external device and used as an interface for interaction between the multifunctional data mobile power supply and the external device.

Alternatively, the gear selection switch includes three gear switches, namely, a charging mode gear switch, a data transmission mode gear switch, and an OTG data mode gear switch, respectively.

Herein, the charging mode gear switch is connected with a first input/output (I/O) pin of the main control chip; the data transmission mode gear switch is connected with the second I/O pin of the main control chip; the OTG data mode gear switch is connected with a third I/O pin of the main control chip; and the three gear switches may not be in a closed state at the same time.

The charging mode gear switch is configured to support the charging mode after closed.

The data transmission mode gear switch is configured to support the data transmission mode after closed.

The OTG data mode gear switch is configured to support the OTG data processing mode after closed.

Alternatively, the mobile power supply module includes a start-up circuit, a voltage transformation circuit, a power level indication circuit, a battery protection circuit, a charging control circuit, and one or more lithium batteries.

The start-up circuit is configured to, after receiving the operation command from the main control chip, send a control signal to the charging control circuit and the voltage transformation circuit, to make the charge control circuit and the voltage transformation circuit cooperatively charge the one or more lithium batteries and/or an intelligent mobile terminal, and receive a feedback signal from the battery protection circuit, and according to the feedback signal, control a charging/discharging process of the one or more lithium batteries are controlled to be turned on or off to protect safety of the one or more lithium batteries, detect a power level of the multifunctional data mobile power supply in real time, and send detected power level information to the power level indication circuit.

The voltage transformation circuit is configured to raise or reduce a battery voltage of the one or more lithium batteries or an external input voltage to a voltage required by an external device, and then output to the external device.

The power level indication circuit is configured to indicate a current power level of the multifunctional data mobile power supply.

The battery protection circuit is configured to send the feedback signal to the start-up circuit when the over-current, over-charging, or over-discharging of one or more lithium batteries occurs during a charging process or a discharging process.

The charging control circuit is configured to monitor an entire charging process to charge the one or more lithium batteries and/or the external device.

The one or more lithium batteries are configured to store power energy and charge the external device when the multifunctional data mobile power supply is not connected with the external input power supply.

Alternatively, a controlled end of the start-up circuit is connected with a second communication pin of the main control chip; a power level detection output end of the start-up circuit is connected with an input end of the power level indication circuit; a first signal output end of the start-up circuit is connected with a controlled end of the charging control circuit; and a second signal output end of the start-up circuit is connected with a controlled end of the voltage transformation circuit; and a feedback signal receiving end of the start-up circuit is connected with a signal output end of the battery protection circuit.

A power input end of the charging control circuit is connected with the external input power supply which the interface module is connected with; and a signal output end of the charging control circuit is connected with a feedback signal input end of the battery protection circuit; a power output end of the charging control circuit is connected with a power input end of the lithium battery/batteries.

A power output end of the one or more lithium batteries is connected with a power input end of the voltage transformation circuit.

A power output end of the voltage transformation circuit is connected with the external device which the interface module is connected with; a signal output end of the voltage transformation circuit is connected with a feedback signal input end of the battery protection circuit.

Alternatively, the multifunctional data mobile power supply further includes a data transmission module;

the main control chip is further configured to send an operation command corresponding to the data transmission mode or the OTG data processing mode to the data transmission module after detecting that the gear selection switch selects the data transmission mode or the OTG data processing mode;

the data transmission module is configured to perform data transmission in the data transmission mode or the OTG data processing mode after receiving the operation command corresponding to the data transmission mode or the OTG data processing mode and sent by the main control chip;

the data transmission module includes a first path and a second path separated from each other, and a control unit connected with the first path and the second path, respectively.

Herein two ends of the first path and the second path are connected with the interface module, respectively, and the control unit is connected with a first communication pin of the main control chip;

the first path is configured to execute the data transmission mode;

the second path is configured to execute the OTG data processing mode;

the control unit is configured to control turn-on and turn-off of the first path and the second path.

Alternatively, the interface module includes one or more portable connectors, a universal serial bus (USB)-A, male connector, a card reader module, and/or a hub.

Herein, the one or more portable connectors are configured to connect with an intelligent mobile terminal/terminals.

the USB-A male connector is configured to connect to a personal computer (PC);

the card reader module is configured to connect with a data storage card or an intelligent card; and the hub is configured to be a relay node connecting the one or more portable connectors and the card reader module with the mobile power supply module and a data transmission module.

Alternatively, one end of the card reader module is connected with the data storage card or the intelligent card and another end of the card reader module is connected with the data transmission module via the hub;

one end/ends of the one or more portable connectors is/are connected with a female connector/connectors of one or more intelligent mobile terminals, and another end/other ends of the one or more portable connectors is/are connected with the data transmission module via the hub, or directly with the power output end of the voltage transformation circuit in the mobile power supply module;

one end of the USB-A male connector is connected with a power adapter or a USB-B female connector of the PC, and another end of the USB-A male connector is directly connected with the data transmission module or directly connected with the power input end of the charging control circuit in the mobile power supply module.

Alternatively, the portable connector includes: a USB Type b, a Mini USB-b, a Micro USB-A, a Micro USB-b and a Micro USB 3.0-b.

Alternatively, the power supply further includes a storage module, herein, the storage module is connected with the first path and the second path of the data transmission module, respectively;

the storage module is configured to store data to be stored, and store data in a process of executing the data transmission mode through the first path when the data transmission mode gear switch is closed, or store data in a process of executing the OTG data processing mode through the second path when the OTG data mode gear switch is closed.

Alternatively, the power supply further includes an intelligent card-eject tool configured to take a subscriber identification module (SIM) card of the external device out from the card bin; and the intelligent card-eject tool is placed in a groove of a protective shell of the multifunctional data mobile power supply.

Alternatively, the power supply further includes an indication module, herein, the indication module is connected with a display output port of the main control chip, and is configured to indicate whether an operation mode corresponding to the charging mode, the data transmission mode, or the OTG data processing mode is running normally when executing the charging mode, the data transmission mode, or the OTG data processing mode.

A charging method of multifunctional data mobile power supply, based on any one of the above-mentioned multifunctional data mobile power supplies, includes:

the interface module connecting with an external device, and the gear selection switch selecting different operation modes by an opening and/or closing operation;

the main control chip detecting a gear selection signal of the gear selection switch, and after the gear selection switch selects the charging mode, sending the operation command corresponding to the charging mode to the mobile power supply module;

the mobile power supply module executing the charging mode after receiving the operation command corresponding to the charging mode and sent by the main control chip.

Alternatively, the step of the gear selection switch selecting different operation modes by an opening and/or closing operation, includes:

selecting the charging mode by the opening and/or closing operation of the charging mode gear switch, selecting the data transmission mode by an opening and/or closing operation of the data transmission mode gear switch, and selecting the OTG data processing mode by an opening and/or closing operation of the gear switch for OTG data processing mode.

A computer program includes program instructions, and when the program instructions are executed by a computer, the computer can execute any one of the above-mentioned charging methods.

A carrier carrying the above-mentioned computer program is provided.

Compared with the related art, the invention includes a multifunctional data mobile power supply and a charging method thereof. The mobile power supply includes a gear selection switch, a main control chip, a mobile power supply module and an interface module. Herein, the gear selection switch is configured to select different operation modes by an opening and/or closing operation; the main control chip is configured to detect a gear selection signal of the gear selection switch, and after the gear selection switch selects a charging mode, send an operation command to a mobile power supply module; the mobile power supply module is configured to execute the charging mode after receiving the operation command which is sent by the main control chip; and the interface module is configured to connect with an external device and used as an interaction interface of the multifunctional data mobile power supply with the external device; and the power supply further includes a data transmission module and a storage module. The scheme of the present invention can charge for the user at anytime and anywhere, and can connect with multiple intelligent mobile terminals, and support connections of USB and card reader interfaces at the same time. Moreover, the mobile power supply can support multiple operation modes and have the data transmission function due to the added data transmission module in the mobile power supply. Additionally, besides having a charging function, the mobile power supply also can be used as a storage card due to the added storage module in the mobile power supply, thus further improving the applicability of a data card. Therefore, the mobile power supply of the present invention has multiple functions and is compact and portable, thereby reducing the burden of the user's bag and enhancing the user experience.

BRIEF DESCRIPTION OF DRAWINGS

The accompanying drawings of the embodiments of the present invention are illustrated as follows, and the accompanying drawings of the embodiments are used for further understanding of the present invention, and are used to explain the principles of the invention together with the specification, and should not be construed as limiting the protection scope of present invention.

FIG. 2 is a flow chart of a charging method based on a multifunctional data mobile power supply according to an embodiment of the present invention;

FIG. 3 is a schematic diagram of an intelligent card-eject tool according to an embodiment of the present invention.

DETAILED DESCRIPTION

Figure 1:
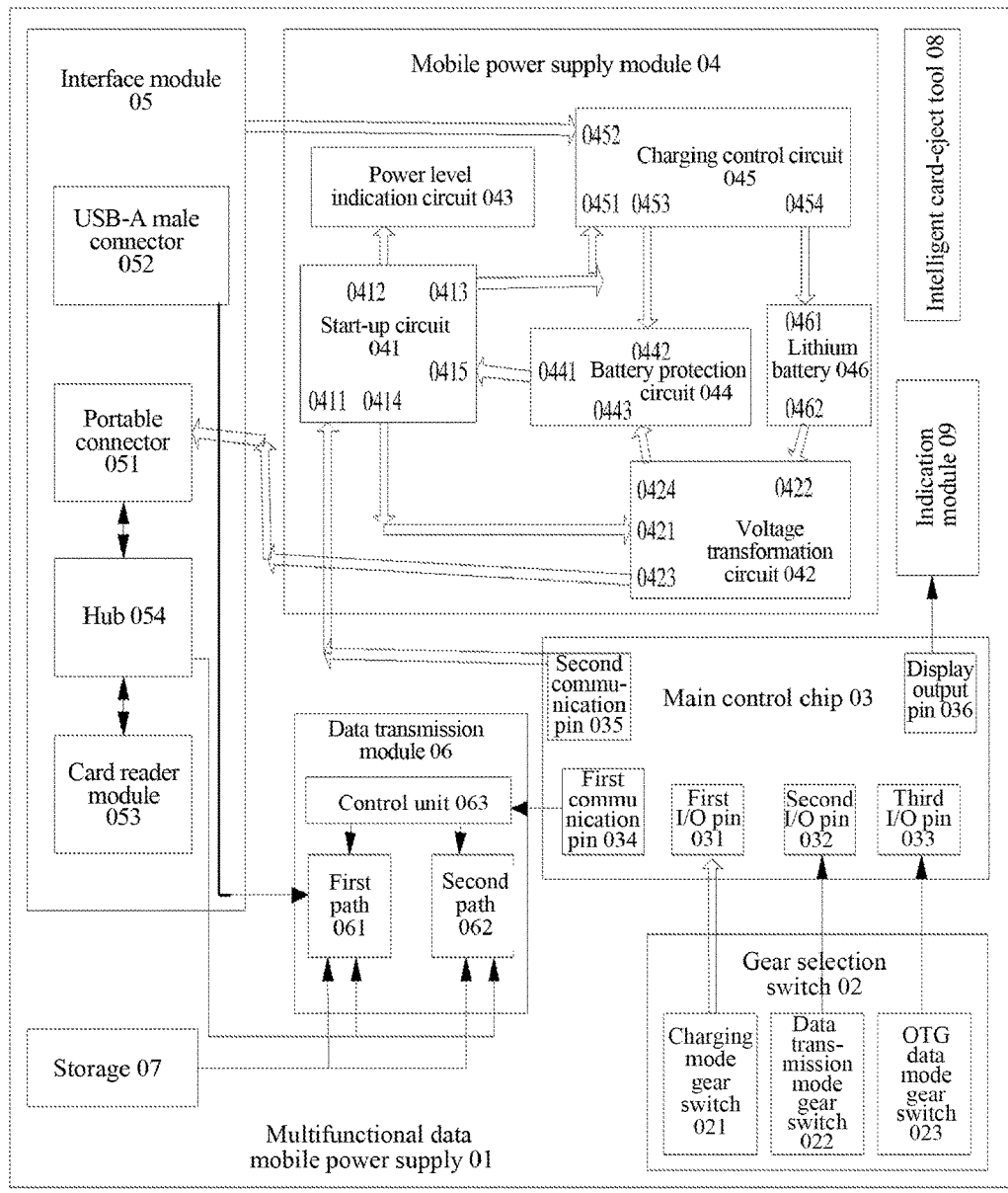
FIG. 1 is a structure diagram of a multifunctional data mobile power supply according to an embodiment of the present invention.

The embodiments of the present document will be described in detail below in conjunction with accompanying drawings and are not intended to limit the protection scope of the invention.

An embodiment of the present invention proposes a multifunctional data mobile power supply 01 which, as shown in FIG. 1, includes a gear selection switch 02, a main control chip 03, a mobile power supply module 04 and an interface module 05.

The gear selection switch 02 is configured to select different operation modes by an opening and/or closing operation.

Alternatively, the gear selection switch 02 includes three gear switches, namely, a charging mode gear switch 021, a data transmission mode gear switch 022, and an OTG data mode gear switch 023, respectively.

The charging mode gear switch 021 is connected with a first input/output (I/O) pin 031 of the main control chip 03; the data transmission mode gear switch 022 is connected with the second I/O pin 032 of the main control chip 03; the OTG data mode gear switch 023 is connected with a third I/O pin 033 of the main control chip 03; and the three gear switches cannot be in a closed state at the same time, but any two of them may be in the closed state at the same time.

The charging mode gear switch 021 is configured to support a charging mode after closed.

The data transmission mode gear switch 022 is configured to support the data transmission mode after closed.

The OTG data mode gear switch 023 is configured to support the OTG data processing mode after closed.

The main control chip 03 is configured to detect the operation mode selected by the gear selection switch 02, and after the gear selection switch 02 selects a charging mode, send an operation command to a mobile power supply module 04.

The mobile power supply module 04 is configured to execute the charging mode after receiving the operation command sent by the main control chip 03.

Alternatively, the mobile power supply module 04 includes a start-up circuit 041, a voltage transformation circuit 042, a power level indication circuit 043, a battery protection circuit 044, a charging control circuit 045, and one or more lithium batteries 046.

The start-up circuit 041 is configured to, after receiving an operation command sent by the main control chip 03, send a control signal to the charging control circuit 045 and the voltage transformation circuit 042, such that the charge control circuit 045 and the voltage transformation circuit 042 cooperatively charge the one or more lithium batteries 046 and/or an intelligent mobile terminal; and receive a feedback signal from the battery protection circuit 044, and according to the feedback signal, control a charging/discharging process of the lithium battery 046 to be turned on or off to protect the safety of the one or more lithium batteries 046, detect a power level of the multifunctional data mobile power supply 01 in real time, and send detected power level to the power level indication circuit 043.

The way that the charging control circuit 045 and the voltage transformation circuit 042 cooperatively charge the one or more lithium batteries 046 and/or an intelligent mobile terminal belongs to the existing art, and will not be described herein anymore.

Alternatively, the start-up circuit 041 is configured to detect the power level of the multifunctional data mobile power supply 01 in real time in the following way:

The power level is detected by detecting the voltage of a built-in battery during charging and discharging; when the battery voltage reaches the rated maximum value, that is, the power level is 100%, and when the voltage drops to the rated minimum value, that is, the power level is 0%. In the process of 0% to 100%, it is determined by monitoring the voltage in real time and calculating, in advance, a voltage value corresponding to the rated capacity of the battery.

The voltage transformation circuit 042 is configured to raise or reduce a battery voltage of the one or more lithium batteries 046 or an external input voltage to a voltage required by an external device, and then output the voltage to the external device.

Alternatively, when the external device is a mobile terminal, the voltage required by the external device may be 5V or other values.

The power level indication circuit 043 is configured to indicate that the current power of the multifunctional data mobile power supply 01 is full or not full, by flashing, keeping lighting up, conversion of lights in various colors, or other implementations which can distinguish whether the current power of the mobile power supply 01 is full.

The battery protection circuit 044 is configured to send a feedback signal to the start-up circuit 041 to turn off the connection of the lithium battery 046 with the outside to protect the safety of lithium battery 046 when the over-current, over-charging, or over-discharging of one or more lithium batteries 046 occurs during a charging process or a discharging process.

Alternatively, prohibiting the over-charging refers to as that charging would be stopped by an over-charging protection function if the voltage of any one of the lithium batteries 046 during charging exceeds the rated voltage.

Prohibiting the over-discharging refers to as that an anti-over-discharging function works at the minimum of the dispersion current, the purpose is to avoid the voltage of the lithium battery 046 below the rated voltage (2.3V or less). When the over-discharging is prevented, the power consumption of the battery protection circuit 044 is reduced, and the minimum is 0.5 μA or less. The battery protection circuit 044 will monitor each lithium battery 046 at anytime.

The charging control circuit 045 is configured to monitor entire charging process such that the mobile power supply module charges the lithium battery 046 and/or the external device in a linear manner.

The linear manner is well known to those skilled in the art. Taking the charging control of the lithium battery as an example, in the charging process, first a pre-charging process is performed on the lithium battery in a trickle charging manner, which is also known as restorative charging. When the battery voltage is below the rated value, the battery is charged with a constant current. When the battery voltage rises above a trickle charging threshold, the charging current is increased to enter a stage of constant-current charging. As the voltage rises continuously, when the battery voltage rises to a threshold, the constant-current charging ends and the constant-voltage charging starts, and until the current drops to the rated value, the charging ends.

One or more lithium batteries 046 are configured to store power energy and charge the external device when the multifunctional data mobile power supply 01 is not connected with the external input power supply. Herein, a battery pack may consist of multiple lithium batteries 046 in series or in parallel.

Alternatively, a controlled end 0411 of the start-up circuit 041, i.e. a first controlled end, is connected with a second communication pin 035 of the main control chip 03; a power level detection output end 0412 of the start-up circuit 041 is connected with an input end of the power level indication circuit 043; a signal output end 0413 of the start-up circuit 041, i.e. a first signal output end, is connected with a controlled end 0451 of the charging control circuit 045, i.e. a second controlled end; and another signal output end 0414 of the start-up circuit 041, i.e. a second output end, is connected with a controlled end 0421 of the voltage transformation circuit 042, i.e. a third controlled end; and a feedback signal receiving end 0415 of the start-up circuit 041 is connected with a signal output end 0441 of the battery protection circuit 044, i.e. a third signal output end.

A power input end 0452 of the charging control circuit 045, i.e. a first power input end, is connected with the external input power supply which the interface module 05 is connected with; and a signal output end 0453 of the charging control circuit 045, i.e., a third signal output end, is connected with a feedback signal input end 0442 of the battery protection circuit 044, i.e. a first feedback signal input end; a power output end 0454 of the charging control circuit 045, i.e. a first power output end, is connected with a second power input end 0461 of the one or more lithium batteries 046, i.e. a second power input end.

A power output end 0462 of the one or more lithium batteries 046, i.e. a second power output end, is connected with a power input end 0422 of the voltage transformation circuit 042, i.e. a third power input end.

A power output end 0423 of the voltage transformation circuit 042, i.e. a third power output end, is connected with the external device which the interface module 05 is connected with; a fourth signal output end 0424 of the voltage transformation circuit 042 is connected with a feedback signal input end 0443 of the battery protection circuit 044, i.e. a second feedback signal input.

The interface module 05 is configured to connect with the external device and used an interface for interaction between the multifunctional data mobile power supply 01 and the external device.

Alternatively, the interface module 05 includes one or more portable connectors 051, a USB-A male connector 052, a card reader module 053, and a hub 054, all of which are used to connect with external devices.

The one or more portable connectors 051 are configured to connect with an intelligent mobile terminal/terminals; the USB-A male connector 052 is configured to connect with a personal computer (PC); the card reader module 053 is configured to connect with a data storage card or an intelligent card; the hub 054 is configured to be a relay node connecting the one or more portable connectors 051 and the card reader module 053 with the mobile power supply module 04 and a data transmission module 06.

Alternatively, one end of the card reader module 053 is connected with the intelligent card, and another end of the card reader module 053 is connected with the data transmission module 06 via the hub 054.

One end/ends of the one or more portable connectors 051 is connected with a female connector/connectors of one or more intelligent mobile terminals, and another end/other ends of the one or more portable connectors 051 is/are connected with the data transmission module 06, or directly connected with the third power output end 0423 of the voltage transformation circuit 042 in the mobile power supply module 04.

One end of the USB-A male connector 052 is connected with a power adapter or a USB-B female connector of the PC, another end of the USB-A male connector 052 is directly connected with the data transmission module 06 or with the first power input terminal 0452 of the charging control circuit 045 in the mobile power supply module 04 (not shown in the figure).

Alternatively, the portable connector 051 includes: a USB Type b, a Mini USB-b, a Micro USB-A, a Micro USB-b and a Micro USB 3.0-b.

Alternatively, the multifunctional data mobile power supply 01 further includes a data transmission module 06 which is configured to perform data transmission in the data transmission mode or the OTG data processing mode after receiving the operation command sent by the main control chip 03.

The data transmission module 06 includes a first path 061 and a second path 062 separated from each other, and a control unit 063 connected with the first path 061 and the second path 062, respectively. Two ends of the first path 061 and the second path 062 are connected with the hub 054 in the interface module 05 respectively, and the control unit 063 is connected with a first communication pin 034 of the main control chip 03.

The first path 061 is configured to perform the data transmission mode.

The second path 062 is configured to perform the OTG data processing mode.

The control unit 063 is configured to control turn-on and turn-off of the first path 061 and the second path 062.

Alternatively, the main control chip 03 is further configured to send an operation command to the data transmission module 06 after detecting a signal that the gear selection switch 02 selects the data transmission mode or the OTG data processing mode.

Alternatively, the multifunctional data mobile power supply 01 further includes a storage module/storage 07 configured to store data to be stored in the multifunctional data mobile power supply 01. The storage module 07 includes a data storage card.

The storage module 07 is connected with the first path 061 and the second path 062 of the data transmission module 06, respectively, and the data transmission mode is executed through the first path 061 when the data transmission mode gear switch 022 is closed, or the OTG data processing mode is executed through the second path 062 when the OTG data mode gear switch 023 is closed.

Alternatively, the multifunctional data mobile power supply 01 further includes an intelligent card-eject tool 08 configured to take a subscriber identification module (SIM) card of the intelligent mobile terminal out from the card bin.

Alternatively, the schematic diagram of the intelligent card-eject tool 08 is shown in FIG. 3.

The intelligent card-eject tool is placed in a groove of a protective shell of the multifunctional data mobile power supply 01, and is opened or retracted by rotation.

Alternatively, the multifunctional data mobile power supply 01 further includes an indication module 09 which is connected with a display output pin 036 of the main control chip 03 and configured to indicate whether the operation mode is running normally when executing the charging mode, the data transmission mode, or the OTG data processing mode.

Based on the multifunctional data mobile power supply 01, an embodiment of the present invention also provides a charging method. As shown in FIG. 2, the method includes steps In step S101, an interface module 05 is connected with an external device, and a gear selection switch 02 selects different operation modes by an opening and/or closing operation.

Alternatively, the step that a gear selection switch 02 selects different operation modes by the opening and/or closing operation, includes:

a charging mode is selected by an opening and/or closing operation of a charging mode gear switch 021;

a data transmission mode is selected by an opening and/or closing operation of a data transmission mode gear switch 022; and an OTG data processing mode is selected by an opening and/or closing operation of an OTG data mode gear switch 023.

In step S102, the main control chip 03 detects a gear selection signal of the gear selection switch 02, and after the gear selection switch 02 selects a charging mode, the main control chip 03 sends an operation command corresponding to the charging mode to a mobile power supply module 04.

Alternatively, the step that the main control chip 03 sends an operation command corresponding to the charging mode to a mobile power supply module 04, includes:

when the charging mode gear switch is closed, the main control chip 03 commands a start-up circuit 041 of the mobile power supply module 04 to turn on to execute the charging mode.

Alternatively, the method further includes:

the start-up circuit 041 sends a control signal to the charging control circuit 045 and the voltage transformation circuit 042 after receiving an operation command sent by the main control chip 03 to start up the mobile power supply module 04.

Alternatively, a power adapter or a USB-B female connector of a personal computer (PC) is connected via a USB-A male connector, such that an intelligent mobile terminal connected with a portable connector, or a lithium battery 046 is charged in a linear manner; or the lithium battery 046 charges an external device when the USB-A male connector doesn't connect with any device; and the charging control circuit 045 monitors the entire charging process. Herein, when charging the external device, the voltage transformation circuit 042 of the mobile power supply module 04 raises or reduces a battery voltage of the lithium battery 046 or an external input voltage to a voltage required by the external device, and then outputs the voltage to the external device.

The start-up circuit 041 further detects a power level of the multifunctional data mobile power supply 01 in real time, and sends the detected power level to the power level indication circuit 043. The power level indication circuit 043 indicates a current power level of the multifunctional data mobile power supply 01 in any power level indication manner, such as flashing, keeping lighting up or the like. For example, that the current power is full or not full may be indicated. When the external power supply charges the external device via the power adapter, if the power level indication circuit flashes to indicate that the current power level is not full, the external power supply charges one or more lithium batteries 046 at the same time. When the USB-A male connector connects with the power adapter or the USB-B female connector of the PC, the portable connector 051 doesn't connect with any intelligent mobile terminal, if the power level indication circuit flashes to indicate that the current power level is not full, the external power supply charges one or more lithium batteries 046.

The battery protection circuit 044 sends a feedback signal to the start-up circuit 041 when the over-current, overcharging, or over-discharging of one or more lithium batteries 046 occurs during a charging process or a discharging process, and according to the feedback signal, the start-up circuit 041 controls a charging/discharging process of the one or more lithium batteries 046 to be turned on or off to protect the safety of the one or more lithium batteries 046.

In step S103, the mobile power supply module 04 executes the charging mode to charge the external device connected with the interface module 05 after receiving the operation command corresponding to the charging mode and sent by the main control chip 03.

Alternatively, the method further includes:

when the gear selection switch 02 does not select the charging mode and the data transmission mode gear switch 022 is closed, the main control chip 03 commands a control unit 063 of the data transmission module 06 to control a first path 061 to turn on to execute the data transmission mode;

when the gear selection switch 02 does not select the charging mode and the OTG data mode gear switch 023 is closed, the main control chip 03 commands a control unit 063 of the data transmission module 06 to control a second path 062 to turn on to execute the OTG data mode.

Alternatively, the data transmission mode refers to respective data transmission between the intelligent mobile terminal, the intelligent card, and/or the storage module 07 of the multifunctional data mobile power supply 01 and the personal computer (PC); the PC identifies and controls data information in the intelligent mobile terminal, the intelligent card, and/or the storage module 07.

The PC simultaneously identifies and controls data information in all intelligent mobile terminal, the intelligent card, and/or the storage module 07 when all of the one or more portable connectors 051 and the card reader module 053 connect with the intelligent mobile terminal or the intelligent card, respectively; the PC only identifies and controls data information in the connected intelligent mobile terminal, intelligent card, and/or storage module 07 when any one of the one or more portable connectors 051 and the card reader module 053 is not connected with any intelligent mobile terminal or intelligent card.

Alternatively, the OTG data processing mode refers to data processing in the OTG mode between the intelligent mobile terminal and the intelligent card, between multiple intelligent mobile terminals, or between multiple intelligent mobile terminals and/or the intelligent cards and the storage module 07 of the multifunctional data mobile power supply 01.

Alternatively, the method further includes that a subscriber identification module (SIM) card of the intelligent mobile terminal is taken out from the card bin by using an intelligent card-eject tool 08 placed in a groove of a protective shell of the multifunctional data mobile power supply 01 before executing the data transmission mode or the OTG data processing mode. For example, the intelligent card-eject tool 08 is opened or retracted by rotation.

Alternatively, the method further includes using an indication module 09 to indicate whether the operation mode is normally running when executing the charging mode, the data transmission mode, or the OTG data processing mode.

An embodiment of the present invention further discloses a computer program including program instructions, when the program instructions are executed by a computer, the computer can execute any of the above-mentioned charging methods.

An embodiment of the present invention also discloses a carrier carrying the computer program.

The present invention proposes a multifunctional data mobile power supply which includes a gear selection switch, a main control chip, a mobile power supply module and an interface module.

The gear selection switch is configured to select different operation modes for executing by an opening and/or closing operation.

The main control chip is configured to detect a gear selection signal of the gear selection switch, and after the gear selection switch selects a charging mode, send an operation command to the mobile power supply module.

The mobile power supply module is configured to execute the charging mode after receiving the operation command sent by the main control chip.

The interface module is configured to connect with an external device and used as an interface for interaction between the multifunctional data mobile power supply and the external device.

Alternatively, the gear selection switch includes three gear switches, namely, a charging mode gear switch, a data transmission mode gear switch, and an OTG data mode gear switch, respectively.

Herein, the charging mode gear switch is connected with a first input/output (I/O) pin of the main control chip; the data transmission mode gear switch is connected with the second I/O pin of the main control chip; the OTG data mode gear switch is connected with a third I/O pin of the main control chip; and the three gear switches may not be in a closed state at the same time.

The charging mode gear switch is configured to support a charging mode after closed.

The data transmission mode gear switch is configured to support the data transmission mode after closed.

The OTG data mode gear switch is configured to support the OTG data processing mode after closed.

Alternatively, the mobile power supply module includes a start-up circuit, a voltage transformation circuit, a power level indication circuit, a battery protection circuit, a charging control circuit, and one or more lithium batteries.

The start-up circuit is configured to, after receiving an operation command sent by the main control chip, send a control signal to the charging control circuit and the voltage transformation circuit, to charge the one or more lithium batteries and/or the intelligent mobile terminal cooperatively; and receive a feedback signal from the battery protection circuit, and according to the feedback signal, control a charging/discharging process of the one or more lithium batteries to be turned on or off to protect the safety of the one or more lithium batteries, and detect a power level of the multifunctional data mobile power supply in real time to send to the power level indication circuit.

The voltage transformation circuit is configured to raise or reduce a battery voltage of the one or more lithium batteries or an external input voltage to 5V, and then output to the intelligent mobile terminal.

The power level indication circuit is configured to indicate that the current power of the multifunctional data mobile power supply 01 is full or not full by flashing or keeping lighting up.

The battery protection circuit is configured to send a feedback signal to the start-up circuit to turn off the connections of the one or more lithium batteries with the external to protect the safety of the one or more lithium batteries when the over-current, over-charging, or over-discharging of one or more lithium batteries occurs during a charging process or a discharging process.

The charging control circuit is configured to monitor the entire charging process such that the one or more lithium batteries and/or the intelligent mobile terminal are charged in a linear manner.

The one or more lithium batteries are configured to store power energy and charge the intelligent mobile terminal when the multifunctional data mobile power supply is not connected with the external input power supply.

Alternatively, a first controlled end of the start-up circuit is connected with the second communication pin of the main control chip; a power detection output end of the start-up circuit is connected with an input end of the power level indication circuit; a first signal output end of the start-up circuit is connected with a second controlled end of the charging control circuit; and a second signal output end of the start-up circuit is connected with a third controlled end of the voltage transformation circuit; and a feedback signal receiving end of the start-up circuit is connected with a third signal output end of the battery protection circuit.

A first power input end of the charging control circuit is connected with the external input power supply which the interface module is connected with; and a third signal output end of the charging control circuit is connected with a first feedback signal input end of the battery protection circuit; and a first power output end is connected with a second power input end of the lithium battery/batteries.

A second power output end of the one or more lithium batteries is connected with a third power input end of the voltage transformation circuit.

A third power output end of the voltage transformation circuit is connected with the intelligent mobile terminal which the interface module is connected with, and a fourth signal output end of the voltage transformation circuit is connected with a second feedback signal input end of the battery protection circuit.

Alternatively, the multifunctional data mobile power supply further includes a data transmission module which is configured to perform data transmission in the data transmission mode or the OTG data processing mode after receiving the operation command sent by the main control chip.

The data transmission module includes a first path and a second path which are separated from each other, and a control unit connected with the first path and the second path, respectively. Two ends of the first path and the second path are connected with the interface module, respectively, and the control unit is connected with a first communication pin of the main control chip.

The first path is configured to execute the data transmission mode.

The second path is configured to execute the OTG data processing mode.

The control unit is configured to control turn-on and turn-off of the first path and the second path.

Alternatively, the main control chip is further configured to send an operation command to the data transmission module after detecting a signal that the gear selection switch selects the data transmission mode or the OTG data processing mode.

Alternatively, the interface module includes one or more portable connectors, a USB-A male connector, a card reader module and a hub.

The one or more portable connectors are configured to connect with the intelligent mobile terminal; the USB-A male connector is configured to connect with a PC, the card reader module is configured to connect with a data storage card or an intelligent card; and the hub is used as a relay node connecting the one or more portable connectors and the card reader module with the mobile power supply module and a data transmission module.

Alternatively, one end of the card reader module is connected with the intelligent card and another end of the card reader module is connected with the data transmission module via the hub.

One end/ends of the one or more portable connectors is/are connected with a female connector/connectors of one or more intelligent mobile terminals, and another end/other ends of the one or more portable connectors is/are connected with the data transmission module via the hub, or connected with the third power output end of the voltage transformation circuit in the mobile power supply module.

One end of the USB-A male connector is connected with a power adapter or a USB-B female connector of the PC, another end of the USB-A male connector is directly connected with the data transmission module or with the first power input terminal of the charging control circuit in the mobile power supply module.

Alternatively, the portable connector includes: a USB Type b, a Mini USB-b, a Micro USB-A, a Micro USB-b and a Micro USB 3.0-b.

Alternatively, the multifunctional data mobile power supply further includes a storage module configured to store data to be stored in the multifunctional data mobile power supply. Herein, the storage module includes a data storage card.

The storage module is connected with the first path and the second path of the data transmission module, respectively. When the data transmission mode gear switch is closed, the data transmission mode is executed through the first path, or when the OTG data mode gear switch is closed, the OTG data processing mode is executed through the second path.

Alternatively, the multifunctional data mobile power supply further includes an intelligent card-eject tool configured to take a subscriber identification module (SIM) card of the intelligent mobile terminal out from a card bin.

The intelligent card-eject tool is placed in a groove of a protective shell of the multifunctional data mobile power supply, and is opened or retracted by rotation.

Alternatively, the multifunctional data mobile power supply further includes an indication module connected with a display output port of the main control chip, and configured to indicate whether the operation mode is running normally when executing the charging mode, the data transmission mode, or the OTG data processing mode.

An embodiment of the present invention also provides a charging method based on multifunctional data mobile power supply, and the method includes that:

an interface module is connected with an external device, and a gear selection switch selects different operation modes for executing by an opening and/or closing operation;

a main control chip detects a gear selection signal of the gear selection switch, and after the gear selection switch selects the charging mode, sends an operation command to a mobile power supply module; and a mobile power supply module executes the charging mode after receiving the operation command sent by the main control chip.

Alternatively, the gear selection switch includes three gear switches, namely, a charging mode gear switch, a data transmission mode gear switch, and an OTG data mode gear switch, respectively.

The charging mode gear switch is configured to support a charging mode after closed.

The data transmission mode gear switch is configured to support the data transmission mode after closed.

The OTG data mode gear switch is configured to support the OTG data processing mode after closed.

Alternatively, that the main control chip sends the operation command to the mobile power module refers to as that:

when the charging mode gear switch is closed, the main control chip commands a start-up circuit of the mobile power supply module to turn on to execute the charging mode.

Alternatively, when the charging mode gear switch is not closed, the method further includes:

when the data transmission mode gear switch is closed, the main control chip commands a control unit of the data transmission module to control a first path to turn on to execute the data transmission mode;

when the OTG data mode gear switch is closed, the main control chip commands a control unit of the data transmission module to control a second path to turn on to execute the OTG data processing mode.

Alternatively, the charging mode refers to as that:

the start-up circuit sends a control signal to the charging control circuit and the voltage transformation circuit to start the mobile power supply module after receiving an operation command sent by the main control chip; a power adapter or a USB-B female connector of a PC is connected via a USB-A male connector, such that an intelligent mobile terminal connected with a portable connector or a lithium battery is charged in a linear manner; or the intelligent mobile terminal is charged by the one or more lithium batteries when the USB-A male connector is not connected with any device; and the charging control circuit monitors the entire charging process. Herein, when charging the external device, the voltage transformation circuit of the mobile power supply module raises or reduces a battery voltage of the one or more lithium batteries or an external input voltage to 5V, and then outputs the voltage to the intelligent mobile terminal.

The start-up circuit further detects a power level of the multifunctional data mobile power supply in real time, and sends to the power level indication circuit. The power level indication circuit indicates that a current power level of the multifunctional data mobile power supply is full or not full respectively by flashing, keeping lighting up. When the external power supply charges the intelligent mobile terminal through the power adapter, if the power level indication circuit flashes to indicate that the current power is not full, the external power supply charges one or more lithium batteries at the same time. When the USB-A male connector is connected with the power adapter or the USB-B female connector of the PC, and the portable connector is not connected with any intelligent mobile terminal, if the power level indication circuit flashes to indicate that the current power is not full, one or more lithium batteries is charged by the external power supply.

The battery protection circuit sends a feedback signal to the start-up circuit when the over-current, over-charging, or over-discharging of one or more lithium batteries occurs during a charging process or a discharging process, and according to the feedback signal, the start-up circuit controls a charging/discharging process of the lithium battery to be turned on or off to protect the safety of the one or more lithium batteries.

Alternatively, the data transmission mode refers to that respective data transmission between the intelligent mobile terminal, the intelligent card, and/or the storage module of the multifunctional data portable power supply and the personal computer (PC); and the PC identifies and controls data information in the intelligent mobile terminal, the intelligent card, and/or the storage module.

The PC simultaneously identifies and controls data information in all intelligent mobile terminals, the intelligent card, and/or the storage module when all of the one or more portable connectors and the card reader module connect to the intelligent mobile terminal or the intelligent card, respectively; and the PC only identifies and controls data information in the connected intelligent mobile terminal, intelligent card, and/or storage module when any one of the one or more portable connectors and the card reader module is not connected with any intelligent mobile terminal or intelligent card.

Alternatively, the OTG data processing mode refers to data processing in the OTG mode, between the intelligent mobile terminal and the intelligent card, between multiple intelligent mobile terminals, or between multiple intelligent mobile terminals and/or the intelligent cards and the storage module of the multifunctional data mobile power supply.

Alternatively, the method further includes that a subscriber identification module (SIM) card of the intelligent mobile terminal is taken out from the card bin by using an intelligent card-eject tool placed in a groove of a protective shell of the multifunctional data mobile power supply before executing the data transmission mode or the OTG data processing mode.

Herein, the intelligent card-eject tool is opened or retracted by rotation.

Alternatively, the method further includes using an indication module to indicate whether the operation mode is normally running when executing the charging mode, the data transmission mode, or the OTG data processing mode.

The multifunctional data mobile power supply 01 of an embodiment of the present invention carries the design concept of "perfection, simple, ultra-thin and portable", integrates a charge cable, a data synchronization line, a data storage card which support two standards, the Micro Secure Digital card (Micro SD) and Trans-flash card (TF), an SIM card-eject tool, and a built-in 2500 mAh polymer lithium-ion battery, and charges the intelligent mobile terminal device at anytime. With the OTG technology, various functions, such as expanded storage space, document backup, etc. can be easily provided for the intelligent mobile terminal device. The design is portable and simple, thus the user can hold the multifunctional data mobile power supply and his/her communication device in one hand, greatly reducing the burden which is brought by various accessories of intelligent mobile terminal devices to people, facilitating the travel, and adding pleasure.

It is to be illustrated that the above-mentioned embodiments are only for the purpose of understanding by those skilled in the art and are not intended to limit the scope of the invention, and that any obvious substitutions and improvements made by those skilled in the art to the present invention are within the scope of the present invention without departing from the inventive concept of the present invention.

INDUSTRIAL APPLICABILITY

The multifunctional data mobile power supply and the charging method thereof of the embodiments of the invention can charge for the user at anytime and anywhere, and connect with multiple intelligent mobile terminals and support multiple operation modes, and support connection to the universal serial bus (USB) and the reader interface at the same time. The multifunctional data mobile power supply has a variety of functions, and is compact and portable, thereby reducing the burden of the user's bag and enhancing the user experience. Therefore, the present invention has strong industrial applicability.

What is claimed is:

1. A multifunctional data mobile power supply, comprising a gear selection switch, a main control chip, a mobile power supply module and an interface module, wherein,
the gear selection switch is configured to select different operation modes by an opening and/or closing operation;
the main control chip is configured to detect the operation mode selected by the gear selection switch, and after the gear selection switch selects a charging mode, send an operation command corresponding to the charging mode to the mobile power supply module;

the mobile power supply module is configured to execute the charging mode after receiving the operation command corresponding to the charging mode and sent by the main control chip; and the interface module is configured to connect with an external device and used as an interface for interaction between the multifunctional data mobile power supply and the external device.

2. The multifunctional data mobile power supply of claim 1, wherein, the gear selection switch comprises three gear switches, namely, a charging mode gear switch, a data transmission mode gear switch, and an On-The-Go (OTG) data mode gear switch, respectively;

wherein, the charging mode gear switch is connected with a first input/output (I/O) pin of the main control chip; the data transmission mode gear switch is connected with a second I/O pin of the main control chip; the OTG data mode gear switch is connected with a third I/O pin of the main control chip; and the three gear switches are not in a closed state at a same time;

the charging mode gear switch is configured to support the charging mode after closed;

the data transmission mode gear switch is configured to support the data transmission mode after closed;

the OTG data mode gear switch is configured to support the OTG data processing mode after closed.

3. The multifunctional data mobile power supply of claim 2, the power supply further comprises an indication module, wherein, the indication module is connected with a display output port of the main control chip, and is configured to indicate whether an operation mode corresponding to the charging mode, the data transmission mode, or the OTG data processing mode is running normally when executing the charging mode, the data transmission mode, or the OTG data processing mode.

4. The multifunctional data mobile power supply of claim 2, wherein, the multifunctional data mobile power supply further comprises a data transmission module;

the main control chip is further configured to send an operation command corresponding to the data transmission mode or the OTG data processing mode to the data transmission module after detecting that the gear selection switch selects the data transmission mode or the OTG data processing mode;

the data transmission module is configured to perform data transmission in the data transmission mode or the OTG data processing mode after receiving the operation command corresponding to the data transmission mode or the OTG data processing mode and sent by the main control chip;

the data transmission module comprises a first path and a second path separated from each other, and a control unit connected with the first path and the second path respectively, wherein two ends of the first path and the second path are connected with the interface module respectively, and the control unit is connected with a first communication pin of the main control chip;

the first path is configured to execute the data transmission mode;

the second path is configured to execute the OTG data processing mode;

the control unit is configured to control turn-on and turn-off of the first path and the second path.

5. The multifunctional data mobile power supply of claim 1, wherein the mobile power supply module comprises a start-up circuit, a voltage transformation circuit, a power level indication circuit, a battery protection circuit, a charging control circuit, and one or more lithium batteries;

the start-up circuit is configured to, after receiving the operation command sent by the main control chip, send a control signal to the charging control circuit and the voltage transformation circuit, to make the charge control circuit and the voltage transformation circuit cooperatively charge the one or more lithium batteries and/or an intelligent mobile terminal, and receive a feedback signal from the battery protection circuit, and according to the feedback signal, control a charging/discharging process of the one or more lithium batteries to be turned on or off to protect safety of the one or more lithium batteries; and detect a power level of the multifunctional data mobile power supply in real time, and send detected power level information to the power level indication circuit;

the voltage transformation circuit is configured to raise or reduce a battery voltage of the one or more lithium batteries or an external input voltage to a voltage required by an external device, and then output to the external device;

the power level indication circuit is configured to indicate a current power level of the multifunctional data mobile power supply;

the battery protection circuit is configured to send the feedback signal to the start-up circuit when over-current, over-charging, or over-discharging of one or more lithium batteries occurs during a charging process or a discharging process;

the charging control circuit is configured to monitor an entire charging process to charge the one or more lithium batteries and/or the external device;

the one or more lithium batteries are configured to store power energy and charge the external device when the multifunctional data mobile power supply is not connected with an external input power supply.

6. The multifunctional data mobile power supply of claim 5, wherein, a controlled end of the start-up circuit is connected with a second communication pin of the main control chip; a power level detection output end of the start-up circuit is connected with an input end of the power level indication circuit; a first signal output end of the start-up circuit is connected with a controlled end of the charging control circuit; and a second signal output end of the start-up circuit is connected with a controlled end of the voltage transformation circuit; and a feedback signal receiving end of the start-up circuit is connected with a signal output end of the battery protection circuit;

a power input end of the charging control circuit is connected with the external input power supply which the interface module is connected with; and a signal output end of the charging control circuit is connected with a feedback signal input end of the battery protection circuit; a power output end of the charging control circuit is connected with a power input end of the lithium battery/batteries;

a power output end of the one or more lithium batteries is connected with a power input end of the voltage transformation circuit;

a power output end of the voltage transformation circuit is connected with the external device which the interface module is connected with; a signal output end of the voltage transformation circuit is connected with a feedback signal input end of the battery protection circuit.

7. The multifunctional data mobile power supply of claim 6, wherein, the multifunctional data mobile power supply further comprises a data transmission module;

the main control chip is further configured to send an operation command corresponding to the data transmission mode or the OTG data processing mode to the data transmission module after detecting that the gear selection switch selects the data transmission mode or the OTG data processing mode;

the data transmission module is configured to perform data transmission in the data transmission mode or the OTG data processing mode after receiving the operation command corresponding to the data transmission mode or the OTG data processing mode and sent by the main control chip;

the data transmission module comprises a first path and a second path separated from each other, and a control unit connected with the first path and the second path respectively, wherein two ends of the first path and the second path are connected with the interface module respectively, and the control unit is connected with a first communication pin of the main control chip;

the first path is configured to execute the data transmission mode;

the second path is configured to execute the OTG data processing mode;

the control unit is configured to control turn-on and turn-off of the first path and the second path.

8. The multifunctional data mobile power supply of claim 5, wherein, the multifunctional data mobile power supply further comprises a data transmission module;

the main control chip is further configured to send an operation command corresponding to the data transmission mode or the OTG data processing mode to the data transmission module after detecting that the gear selection switch selects the data transmission mode or the OTG data processing mode;

the data transmission module is configured to perform data transmission in the data transmission mode or the OTG data processing mode after receiving the operation command corresponding to the data transmission mode or the OTG data processing mode and sent by the main control chip;

the data transmission module comprises a first path and a second path separated from each other, and a control unit connected with the first path and the second path respectively, wherein two ends of the first path and the second path are connected with the interface module respectively, and the control unit is connected with a first communication pin of the main control chip;

the first path is configured to execute the data transmission mode;

the second path is configured to execute the OTG data processing mode;

the control unit is configured to control turn-on and turn-off of the first path and the second path.

9. The multifunctional data mobile power supply of claim 1, wherein, the multifunctional data mobile power supply further comprises a data transmission module;

the main control chip is further configured to send an operation command corresponding to the data transmission mode or the OTG data processing mode to the data transmission module after detecting that the gear selection switch selects the data transmission mode or the OTG data processing mode;

the data transmission module is configured to perform data transmission in the data transmission mode or the OTG data processing mode after receiving the operation command corresponding to the data transmission mode or the OTG data processing mode and sent by the main control chip;

the data transmission module comprises a first path and a second path separated from each other, and a control unit connected with the first path and the second path respectively, wherein two ends of the first path and the second path are connected with the interface module respectively, and the control unit is connected with a first communication pin of the main control chip;

the first path is configured to execute the data transmission mode;

the second path is configured to execute the OTG data processing mode;

the control unit is configured to control turn-on and turn-off of the first path and the second path.

10. The multifunctional data mobile power supply of claim 9, wherein, the interface module comprises one or more portable connectors, a USB-A male connector, a card reader module, and/or a hub;

wherein the one or more portable connectors are configured to connect with an intelligent mobile terminal/terminals;

the USB-A male connector is configured to connect with a personal computer (PC);

the card reader module is configured to connect with a data storage card or an intelligent card; and the hub is configured to be a relay node connecting the one or more portable connectors and the card reader module with the mobile power supply module and the data transmission module.

11. The multifunctional data mobile power supply of claim 10, wherein, one end of the card reader module is connected with the data storage card or the intelligent card and another end of the card reader module is connected with the data transmission module via the hub;

one end/ends of the one or more portable connectors is/are connected with a female connector/connectors of one or more intelligent mobile terminals, and another end/other ends of the one or more portable connectors is/are connected with the data transmission module via the hub, or directly with the power output end of the voltage transformation circuit in the mobile power supply module;

one end of the USB-A male connector is connected with a power adapter or a USB-B female connector of the PC, and another end of the USB-A male connector is directly connected with the data transmission module or directly connected with the power input end of the charging control circuit in the mobile power supply module.

12. The multifunctional data mobile power supply of claim 11, wherein, the portable connector comprises a Universal Serial Bus (USB) Type b, a Mini USB-b, a Micro USB-A, a Micro USB-b and a Micro USB 3.0-b.

13. The multifunctional data mobile power supply of claim 9, the power supply further comprises a storage module, wherein, the storage module is connected with the first path and the second path of the data transmission module, respectively;

the storage module is configured to store data to be stored, and store data in a process of executing the data transmission mode through the first path when the data transmission mode gear switch is closed, store data in a process of executing the OTG data processing mode through the second path when the OTG data mode gear switch is closed.

14. The multifunctional data mobile power supply of claim 1, further comprising an intelligent card-eject tool configured to take a subscriber identification module (SIM) card of the external device out from a card bin; wherein the intelligent card-eject tool is placed in a groove of a protective shell of the multifunctional data mobile power supply.

15. A charging method of multifunctional data mobile power supply, based on the multifunctional data mobile power supply of claim 1, comprising:

the interface module connecting with an external device, and the gear selection switch selecting different operation modes by an opening and/or closing operation;

the main control chip detecting a gear selection signal of the gear selection switch, and after the gear selection switch selects the charging mode, sending the operation command corresponding to the charging mode to the mobile power supply module;

the mobile power supply module executing the charging mode after receiving the operation command corresponding to the charging mode and sent by the main control chip.

16. The charging method of claim 15, wherein, the step of the gear selection switch selecting different operation modes by an opening and/or closing operation, comprises:

selecting the charging mode by the opening and/or closing operation of the charging mode gear switch, selecting the data transmission mode by the opening and/or closing operation of the data transmission mode gear switch, and selecting the OTG data processing mode by the opening and/or closing operation of the OTG data mode gear switch.

17. A non-transitory computer-readable medium storing a computer program, wherein the computer program comprising program instructions, when the program instructions are executed by a computer, the computer is enabled to execute the data processing method based on the multifunctional portable data card according to claim 15.

* * * * *